(12) United States Patent
Gerspach et al.

(10) Patent No.: US 12,445,526 B2
(45) Date of Patent: Oct. 14, 2025

(54) REMOTE PROCEDURE CALL BETWEEN ENTITIES IN A SERVICE BUS COMMUNICATION SYSTEM

(71) Applicant: HITACHI ENERGY LTD, Zürich (CH)

(72) Inventors: Stephan Gerspach, Herrischried (DE); Ettore Ferranti, Schleinikon (CH); Jukka Kinnunen, Laihia (FI); Niklaus Meyer, Illnau (CH)

(73) Assignee: Hitachi Energy Ltd, Zürich (CH)

( * ) Notice: Subject to any disclaimer, the term of this patent is extended or adjusted under 35 U.S.C. 154(b) by 269 days.

(21) Appl. No.: 17/409,445

(22) Filed: Aug. 23, 2021

(65) Prior Publication Data

US 2022/0060567 A1 Feb. 24, 2022

(30) Foreign Application Priority Data

Aug. 24, 2020 (EP) .................................... 20192451

(51) Int. Cl.
*H04L 67/133* (2022.01)
*H04L 67/306* (2022.01)
(Continued)

(52) U.S. Cl.
CPC .......... *H04L 67/133* (2022.05); *H04L 67/306* (2013.01); *H04L 67/55* (2022.05); *H04L 67/566* (2022.05)

(58) Field of Classification Search
CPC ..... H04L 67/28; H04L 67/133; H04L 67/306; H04L 67/55; H04L 67/566; H04W 8/18
(Continued)

(56) References Cited

U.S. PATENT DOCUMENTS

| 8,423,621 B2 * | 4/2013 | Warren | H04L 51/00 709/206 |
| 9,118,632 B1 * | 8/2015 | Chuang | H04L 63/0823 |

(Continued)

FOREIGN PATENT DOCUMENTS

| CN | 101848236 A | 9/2010 |
| CN | 106027665 A | 10/2016 |

(Continued)

OTHER PUBLICATIONS

Jaloudi, S., et al., "Integration of Distributed Energy Resources in the Grid by Applying International Standards to the Inverter as a Multifunctional Grid Interface", 2011 IEEE Trondheim PowerTech, Trondheim, Norway, Jun. 19-23, 2011. 8 pages.

(Continued)

*Primary Examiner* — Liang Che A Wang
(74) *Attorney, Agent, or Firm* — Slater Matsil, LLP (57) ABSTRACT

A method for a remote procedure call can be used between entities in a service bus communication system that includes a first consumer, a data exchange system and a number of publishers. The method includes receiving a first request for data from the first consumer at the data exchange system, transmitting the first request from the data exchange system to the plurality of publishers, receiving, by the data exchange system, a first reply to the first request for data from a first publisher of the plurality of publishers, and transmitting the first reply from the data exchange system to the first consumer.

22 Claims, 10 Drawing Sheets

(51) Int. Cl.
H04L 67/55 (2022.01)
H04L 67/566 (2022.01)

(58) Field of Classification Search
USPC .......................................................... 709/203
See application file for complete search history.

(56) References Cited

U.S. PATENT DOCUMENTS

| | | | |
|---|---|---|---|
| 9,430,342 B1* | 8/2016 | Byan | G06F 9/45558 |
| 9,767,134 B2* | 9/2017 | Anderson | H04L 41/28 |
| 11,055,028 B1* | 7/2021 | Kamran | G06F 3/067 |
| 2004/0015835 A1 | 1/2004 | Kotnur et al. | |
| 2004/0117451 A1* | 6/2004 | Chung | H04L 9/40 |
| | | | 709/207 |
| 2006/0117295 A1 | 6/2006 | Wu et al. | |
| 2007/0022430 A1 | 1/2007 | Barker et al. | |
| 2008/0033920 A1* | 2/2008 | Colclasure | H04L 63/10 |
| 2008/0104258 A1 | 5/2008 | O'Neill | |
| 2013/0117554 A1* | 5/2013 | Ylonen | H04L 9/3268 |
| | | | 713/151 |
| 2013/0227547 A1 | 8/2013 | Little | |
| 2014/0025321 A1 | 1/2014 | Spanier | |
| 2014/0123300 A1* | 5/2014 | Jung | G06F 21/44 |
| | | | 726/26 |
| 2015/0222604 A1* | 8/2015 | Ylonen | H04L 9/3263 |
| | | | 713/171 |
| 2017/0126754 A1* | 5/2017 | Taylor | H04L 67/01 |
| 2019/0289067 A1 | 9/2019 | Chiba | |
| 2020/0394535 A1* | 12/2020 | Qin | G09B 7/00 |

FOREIGN PATENT DOCUMENTS

| | | |
|---|---|---|
| CN | 106534242 | 3/2017 |
| JP | 2019160232 A | 9/2019 |

OTHER PUBLICATIONS

Ozansoy, Cagil R., et al., "The Real-Time Publisher/Subscriber Communication Model for Distributed Substation Systems", IEEE Transactions on Power Delivery, vol. 22, No. 3, Jul. 2007, pp. 1411-1423.

* cited by examiner

REMOTE PROCEDURE CALL BETWEEN ENTITIES IN A SERVICE BUS COMMUNICATION SYSTEM

CROSS-REFERENCE TO RELATED APPLICATIONS

This application claims the benefit of European Patent Application No. 20192451.1, filed on Aug. 24, 2020, which application is hereby incorporated herein by reference.

TECHNICAL FIELD

The present disclosure relates to an enhanced communication pattern for message bus middleware.

BACKGROUND

Figure 1:
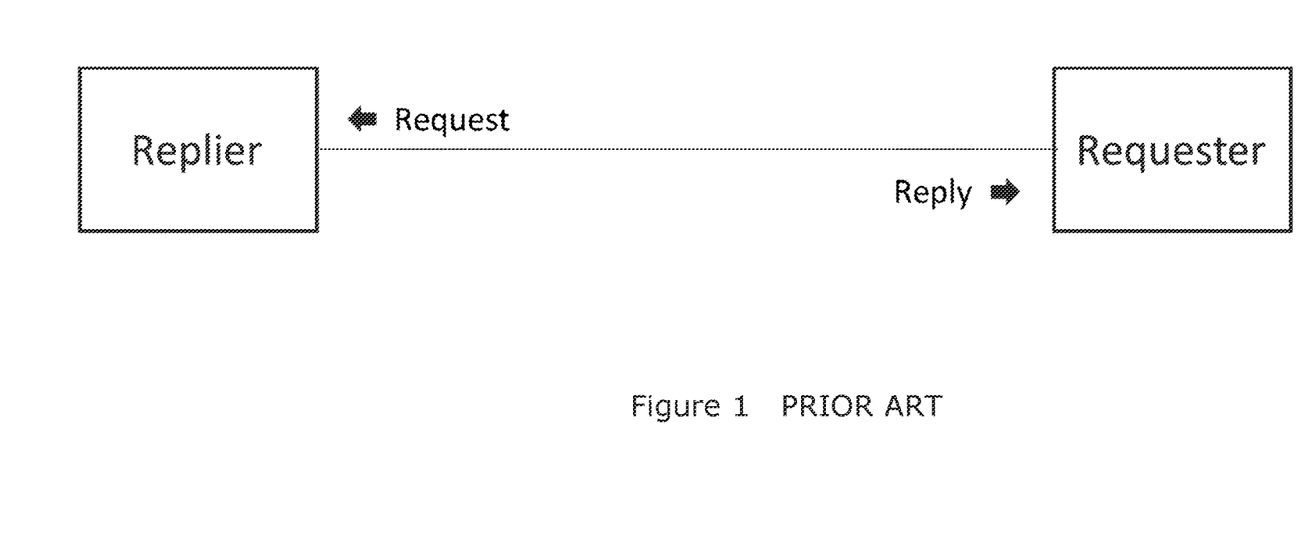
FIG. 1 shows an example of a schematic illustration of an RPC procedure according to the prior art.

A Remote Procedure Call (RPC) in distributed computing is that one computer program can request a service from another program, located in another computer on the same network, without having to understand the details of the network itself. In other words, in an RPC, the computer program/requester causes a procedure to run in a different address space, e.g., a different entity like another computer on a shared network. A schematic illustration of such an RPC is shown in FIG. 1. Such a procedure call is also sometimes known as a function call or a subroutine call. In such an RPC scenario, the service requester must know the service provider and the intent of the function.

Commonly used subscription patterns are Publish/Subscribe based. Publish/Subscribe is a messaging pattern where senders of messages, called publishers, do not program the messages to be sent directly to specific receivers, called subscribers. Similarly, subscribers express interest in one or more classes and only receive messages that are of interest, without knowledge of which publishers, if any, exist. The benefit of this messaging pattern is that the publisher and subscriber do not know each other, and both are operating on data only. The drawback is that all data are always sent to the dataspace, since the data provider does not know which data are needed by the consumers and which not, and therefore it has to publish all the data. Moreover, the subscriber cannot tailor the data distribution pattern, like splitting of requests, transfer on data change, cyclic transfer, provision of current value, coalescing of data, etc.

Moreover, there are domains where mechanisms are used which are closer to Selective-Subscription. For example, open platform communications (OPC) data access (DA) client/Server data subscription is one of the most known examples of this style of subscription.

Figure 2:
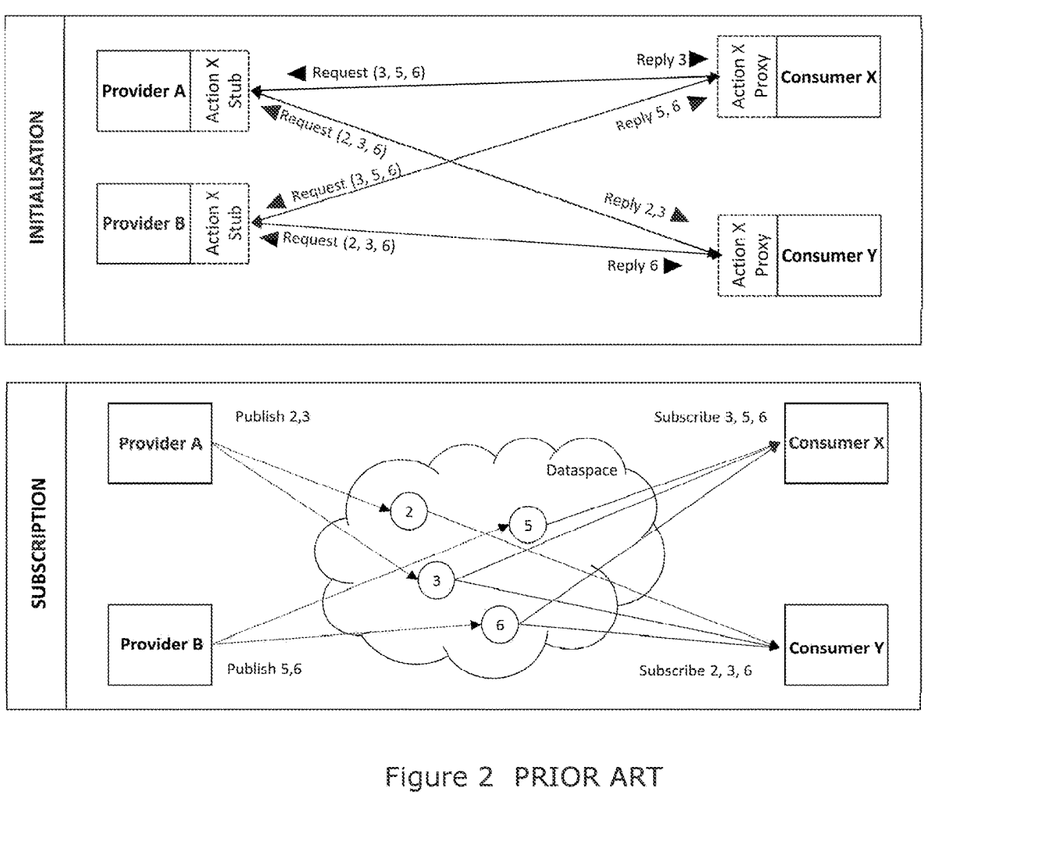
FIG. 2 shows an example of a schematic illustration of an RPC procedure and a subsequent selective subscription according to the prior art.

An OPC pattern which provides a selective subscription is shown in FIG. 2. This OPC pattern is a messaging pattern where subscribers of messages call publishers (or a central broker) first to handshake about the data they need and the data distribution pattern that shall be used. The major drawback is that the subscriber needs to know the publishers and the data the publisher can provide, to be able to set-up the selective subscription channel, or there is a single entity, e.g., a broker, which is handling this. However, the broker might not be trustworthy. The major benefit is that only data that is needed is published which reduces system load and the subscriber can tailor the data distribution pattern, like transfer on data change, transfer cyclically, provide current value, coalescing of data, etc.

In automation systems such as smart grids, intelligent electronic devices (IEDs) form the basic element of the automation system for sensing, measurement, protection, and control. However, it is understood by the skilled person that the automation system is not restricted to smart grids and that the elements of the automation systems are not restricted to IEDs. The elements of an automation system are part of a service bus system and communicate with each other through the service bus. One standard in this field is IEC 61850 and intelligent electronic devices communicate with each other according to said standard. For distributed computing in such automation systems, the respective elements, e.g., the intelligent electronic devices can play the role of both, requester/consumer of data and of replier/publisher providing said data. In the present disclosure the words replier and consumer are used interchangeable. In addition, the words replier and publisher are used interchangeable.

In an automation system, there might be the scenario that the parties involved in a remote procedure call must not know each other and they are completely decoupled. In other words, there might be the requirement that the consumer/requester does not know who is publishing/delivering the requested data and this information should also not be known by any other party like a broker.

SUMMARY

The present disclosure relates to a remote procedure call between entities in a service bus communication system, for example, to a method for a remote procedure call (RPC) between entities in a service bus communication system as well as a respective service bus communication system. Particular embodiments provided in the present disclosure relate to an RPC for the initialization of selective subscription between entities in a service bus communication system as well as a respective service bus communication system.

Embodiments can, inter alia, provide a solution to the requirements discussed above.

A first embodiment relates to a method for a remote procedure call (RPC) between entities in a service bus communication system. The service bus communication system comprises a first consumer, a data exchange system and a plurality of publishers. The method comprises sending a first request for data from the first consumer to the data exchange system, the first request comprising at least one first sub-request for data; transmitting the first request from the data exchange system to the plurality of publishers; receiving, by the data exchange system, a first reply to the first request for data from a first publisher of the plurality of publishers, the first reply comprising a reply to the at least one first sub-request; and transmitting from the data exchange system the first reply to the first consumer. In particular, the method may be used for an RPC for the initialization of selective subscription between entities in a service bus communication system. For example, the RPC may be used for the initialization of selective subscription to consume continuously data updates or just to initialize a data update once. However, it is understood by the skilled person that the RPC of the present disclosure is not limited to this purpose. The RPC of the present disclosure may be used in different scenarios when a requester causes a procedure to run in a different address space.

Various embodiments may preferably implement the following features:

Preferably the method is computer implemented.

Preferably, the data exchange system is provided by a distributed communication middleware within the service bus communication system.

Preferably, the middleware is distributed over several layers of the service bus communication system.

Preferably, the data exchange system comprises a data space provided by the distributed communication middleware.

Preferably, the first request comprises a plurality of first sub-requests.

Preferably, the first reply comprises replies to the respective first sub-requests.

Preferably, the first reply comprises a reply to a first set of the plurality of first sub-requests.

Preferably, the method further comprises receiving, by the data exchange system, a second reply to the first request for data from a second publisher of the plurality of publishers, the second reply comprising a reply to a second set of the plurality of first sub-requests, and transmitting from the data exchange system the second reply to the first consumer.

Preferably, the first set of the plurality of first sub-requests and the second set of the plurality of first sub-requests encompass the entire plurality of first sub-requests. Preferably, the first set and the second set are disjoint.

Preferably, the first consumer repeats the request or at least one of the plurality of sub-request if no reply or an uncomplete reply to the request is received after a certain amount of time.

Preferably, the service bus communication system comprises a second consumer.

Preferably, the method further comprises sending a second request for data from the second consumer to the data exchange system, the second request comprising at least one second sub-request for data; transmitting the second request from the data exchange system to the plurality of publishers; receiving, by the data exchange system, a first reply to the second request for data from the first publisher, the first reply comprising a reply to the at least one second sub-request; transmitting from the data exchange system the first reply to the second consumer.

Preferably, the second request comprises a plurality of second sub-requests.

Preferably, the first reply to the second request comprises replies to the respective second sub-requests.

Preferably, the first reply to the second request comprises a reply to a first set of the plurality of second sub-requests. Preferably, the method further comprises receiving, by the data exchange system, a second reply to the second request for data from a second publisher of the plurality of publishers, the second reply to the second request for data, comprising a reply to a second set of the plurality of second sub-requests, and transmitting from the data exchange system the second reply to the second consumer.

Preferably, the first set of the plurality of second sub-requests and the second set of the plurality of second sub-requests encompass the entire plurality of first sub-requests. Preferably, the first part and the second part are disjoint.

Preferably, the second consumer repeats the request or at least one of the plurality of sub-request if no reply or an uncomplete reply to the request is received after a certain amount of time.

The present disclosure also relates to a method for selective subscription between entities in a service bus communication system. The method comprises the aforementioned method for a remote procedure call, RPC, between entities in a service bus communication system according or any one of the aforementioned preferred embodiments as well as: publishing, by at least one of the plurality of publishers, the data according to the received request for data to the data exchange system; notifying at least one consumer, by the data exchange system, that the requested data according to the request for data of the at least one consumer is available; and subscribing, by the notified at least one consumer, to the requested data.

The present disclosure also relates to a service bus communication system comprising a first consumer, a data exchange system and a plurality of publishers. The first consumer is configured to send a first request for data to a data exchange system, the first request comprising at least one first sub-request for data; the data exchange system is configured to transmit the first request to a plurality of publishers; the data exchange system is configured to receive a first reply to the first request for data from a first publisher of the plurality of publishers, the first reply comprising a reply to the at least one first sub-request; and the data exchange system is configured to transmit the first reply to the first consumer.

Various embodiments may preferably implement the following features:

Preferably, the data exchange system is provided by a distributed communication middleware within the service bus communication system. Preferably, the data exchange system comprises a data space provided by the distributed communication middleware.

Preferably, the first request comprises a plurality of first sub-requests.

Preferably, the first reply comprises replies to the respective first sub-requests.

Preferably, the first reply comprises a reply to a first set of the plurality of first sub-requests. Preferably, the data exchange system is configured to receive a second reply to the first request for data from a second publisher of the plurality of publishers, the second reply comprising a reply to a second set of the plurality of first sub-requests, and the data exchange system is configured to transmit the second reply to the first consumer.

Preferably, the first set of the plurality of first sub-requests and the second set of the plurality of first sub-requests encompass the entire plurality of first sub-requests. Preferably, the first set and the second set are disjoint.

Preferably, the first consumer repeats the request or at least one of the plurality of sub-request if no reply or an uncomplete reply to the request is received after a certain amount of time.

Preferably, the service bus communication system comprises a second consumer.

Preferably, the second consumer is configured to send a second request for data to the data exchange system, the second request comprising at least one second sub-request for data; the data exchange system is configured to transmit the second request to the plurality of publishers; the data exchange system is configured to receive a first reply to the second request for data from the first publisher, the first reply comprising a reply to the at least one second sub-request; the data exchange system is configured to transmit the first reply to the second consumer.

Preferably, the second request comprises a plurality of second sub-requests.

Preferably, the first reply to the second request comprises replies to the respective second sub-requests.

Preferably, the first reply to the second request comprises a reply to a first set of the plurality of second sub-requests. Preferably, the data exchange system is configured to receive a second reply to the second request for data from a second publisher of the plurality of publishers, the second reply to the second request for data, comprising a reply to a second set of the plurality of second sub-requests, and the data exchange system is configured to transmit the second reply to the second consumer.

Preferably, the first set of the plurality of second sub-requests and the second set of the plurality of second sub-requests encompass the entire plurality of first sub-requests. Preferably, the first part and the second part are disjoint.

Preferably, the second consumer repeats the request or at least one of the plurality of sub-request if no reply or an uncomplete reply to the request is received after a certain amount of time.

According to the present disclosure, the subscriber does not have to know the publisher and the system load is only as high as needed, data that are not requested are not published. Moreover, publishers can be exchanged at runtime without the need to notify subscribers leading to a high redundancy. Moreover, the present disclosure leads to less initialization load as fewer RPC calls are needed. In addition, only a reduced number of connections on subscriber side are needed by providing exactly what the consumer requests in a connection.

With such a topic based RPC request as in the present disclosure, the subscriber/consumer will ask for data, and specific data distribution pattern. But the RPC request is not addressing the providing services directly, but the RPC is addressed to the dataspace.

Service capable to provide the requested data will start to publish those data in the data space and the subscriber initiated the session will consume the data. In this way, this is still a kind of peer to peer communication between requester and provider not knowing each other. This provides, among others, the following benefits compared to known Publish/Subscribe and Selective Subscription methods:

The subscriber does not have to know the publisher.

The system load is only as high as needed; data that is not requested are not published.

Publishers can be exchanged (redundancy) at runtime without the need to notify subscribers.

Less initialization load (fewer RPC calls needed).

Reduced number of connections on subscriber side, by providing exactly what the consumer requests in a connection.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure.

Therefore, the drawings should not be considered limiting of the breadth, scope, or applicability of the present disclosure.

It should be noted that for clarity and ease of illustration these drawings are not necessarily drawn to scale.

DETAILED DESCRIPTION OF ILLUSTRATIVE EMBODIMENTS

Figure 3A:
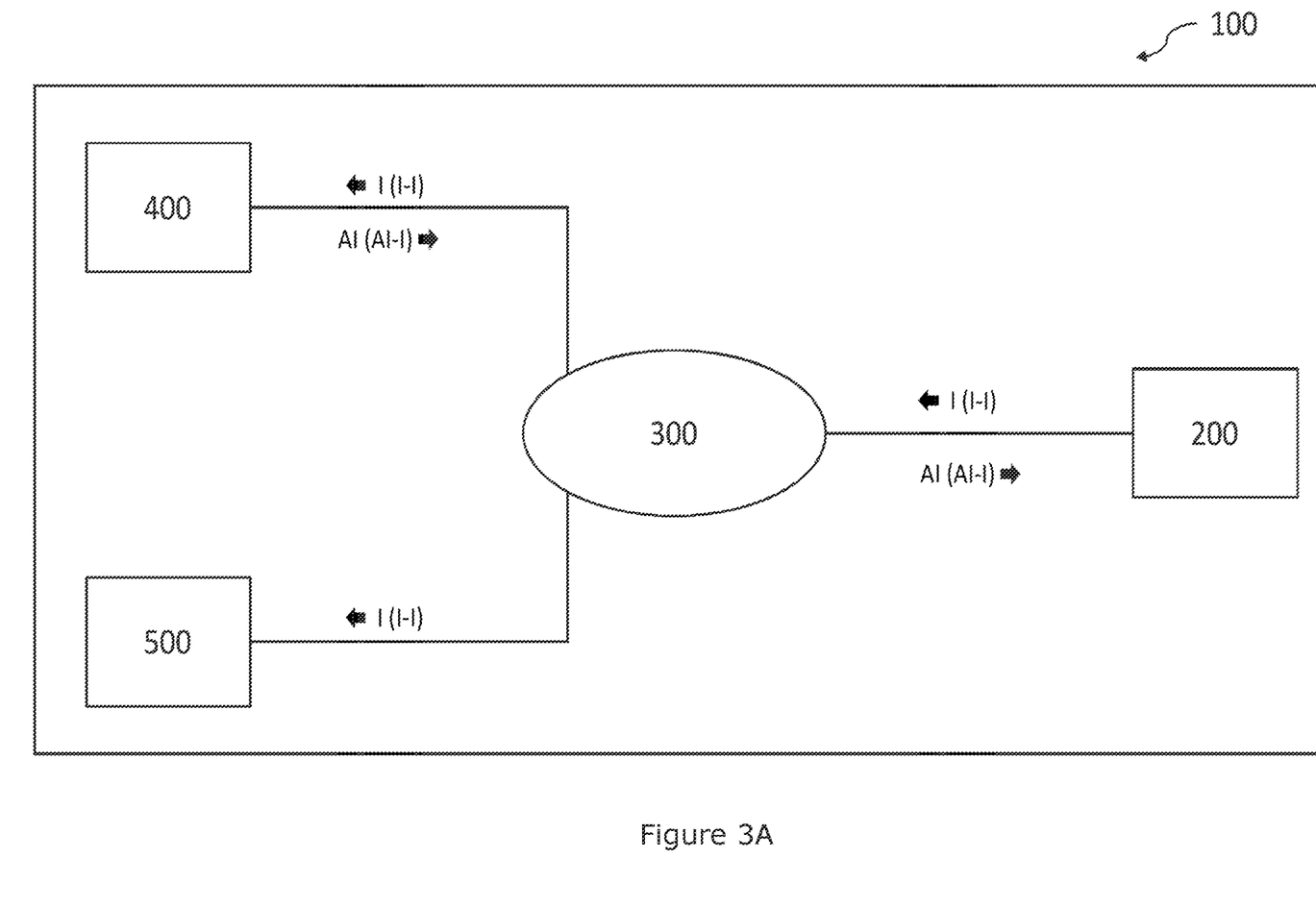
FIG. 3A shows an example of a schematic illustration of an RPC procedure according to the present disclosure.

FIG. 3A shows an example of a schematic illustration of an RPC procedure according to the present disclosure. The RPC procedure is carried out in a service bus communication system 100 comprising a first consumer 200, a data exchange system 300 and a plurality of publishers 400 and 500.

In a first step, the first consumer 200 sends a first request for data I to the data exchange system 300, a middleware provided by the service bus system according to this embodiment. The first request I comprises a first sub-request for data I-I.

The data exchange system 300 receives the first request I from the first consumer 200 and transmits it to the first publisher 400 and the second publisher 500. It has to be emphasized that at this stage latest, the first request I transmitted to the publishers 400, 500 must not contain any pointer to its origin. In other words, either the first consumer 200 sends the first request for data I without any information about its origin, i.e. the first consumer 200, or the data exchange system 300 removes this information (e.g., by removing any header or control information) before transmitting the first request I to the publishers 400, 500.

According to this embodiment, only the first publisher 400 is sending a reply AI to the first request I to the data exchange system 300. The first reply AI comprises a reply AI-I to the first sub-request I-I. After receipt of the first reply AI, the data exchange system 300 transmits the first reply AI to the first consumer 200. As above, it has to be emphasized that the first reply AI must not contain any pointer about its origin. Therefore, the first publisher 400 sends the reply AI without information about its origin, i.e. the first publisher 400, to the data exchange system 300 or the data exchange system 300 removes this information (e.g. by removing any header or control information) before transmitting the first reply AI to the first consumer 200.

Figure 3B:
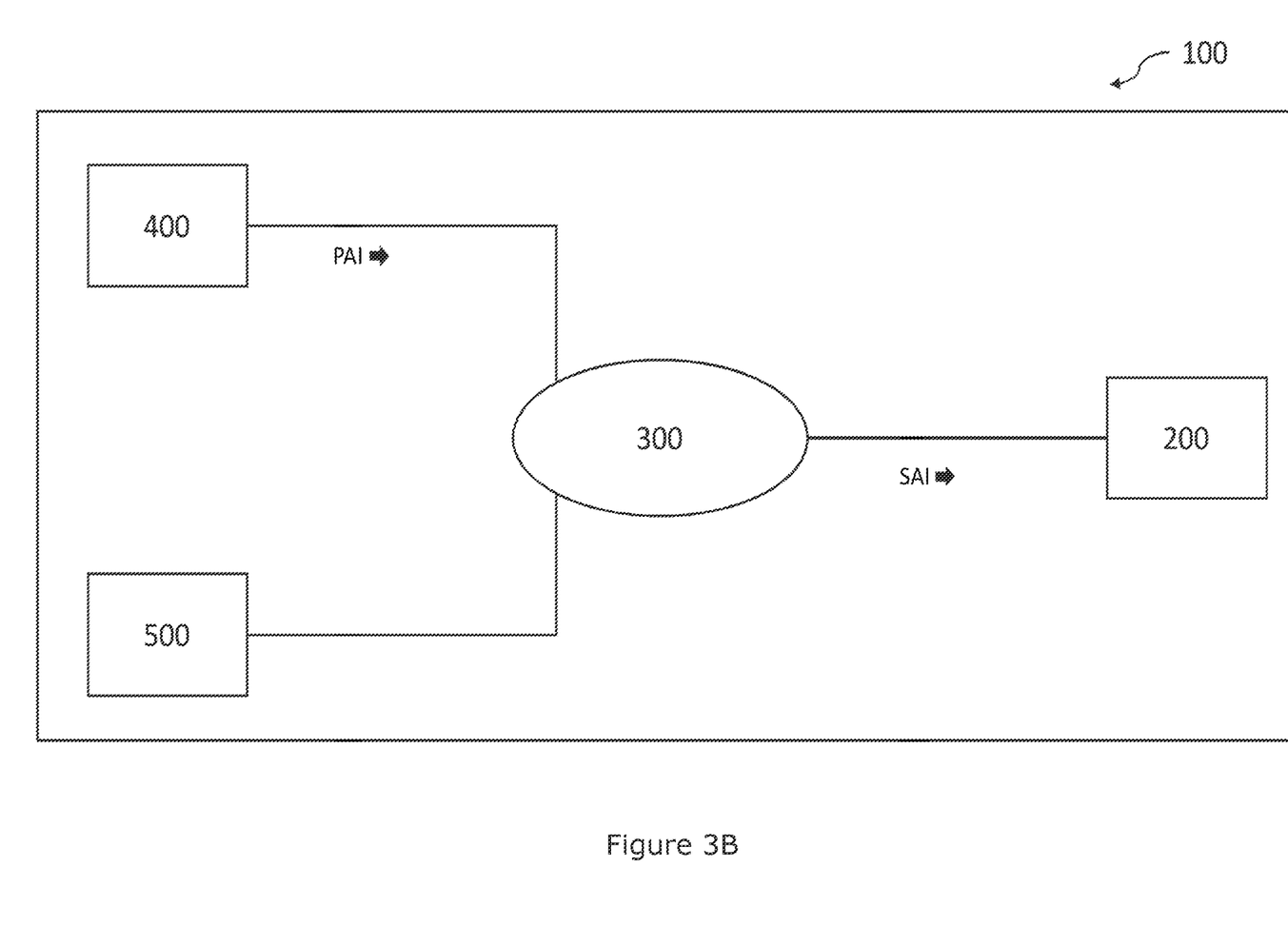
FIG. 3B shows an example of a schematic illustration of selective subscription according to the present disclosure following the RPC procedure shown in FIG. 3A.

FIG. 3B shows an example of a schematic illustration of selective subscription according to the present disclosure subsequent to the RPC procedure shown in FIG. 3A. The RPC procedure is used for selective subscription. However, it is understood by the skilled person that the RPC of the present disclosure is not limited to this purpose. The RPC of the present disclosure may be used in different scenarios when a requester causes a procedure to run in a different address space. After the first consumer 200 received the first reply AI from the data exchange system 300, the first publisher publishes the data PAI requested in the first request I to the data exchange system 300. The data exchange system 300 notifies the first consumer 200 that the requested data are available and the first consumer 200 performs a first subscription SAI to the requested data PAI.

Figure 4A:
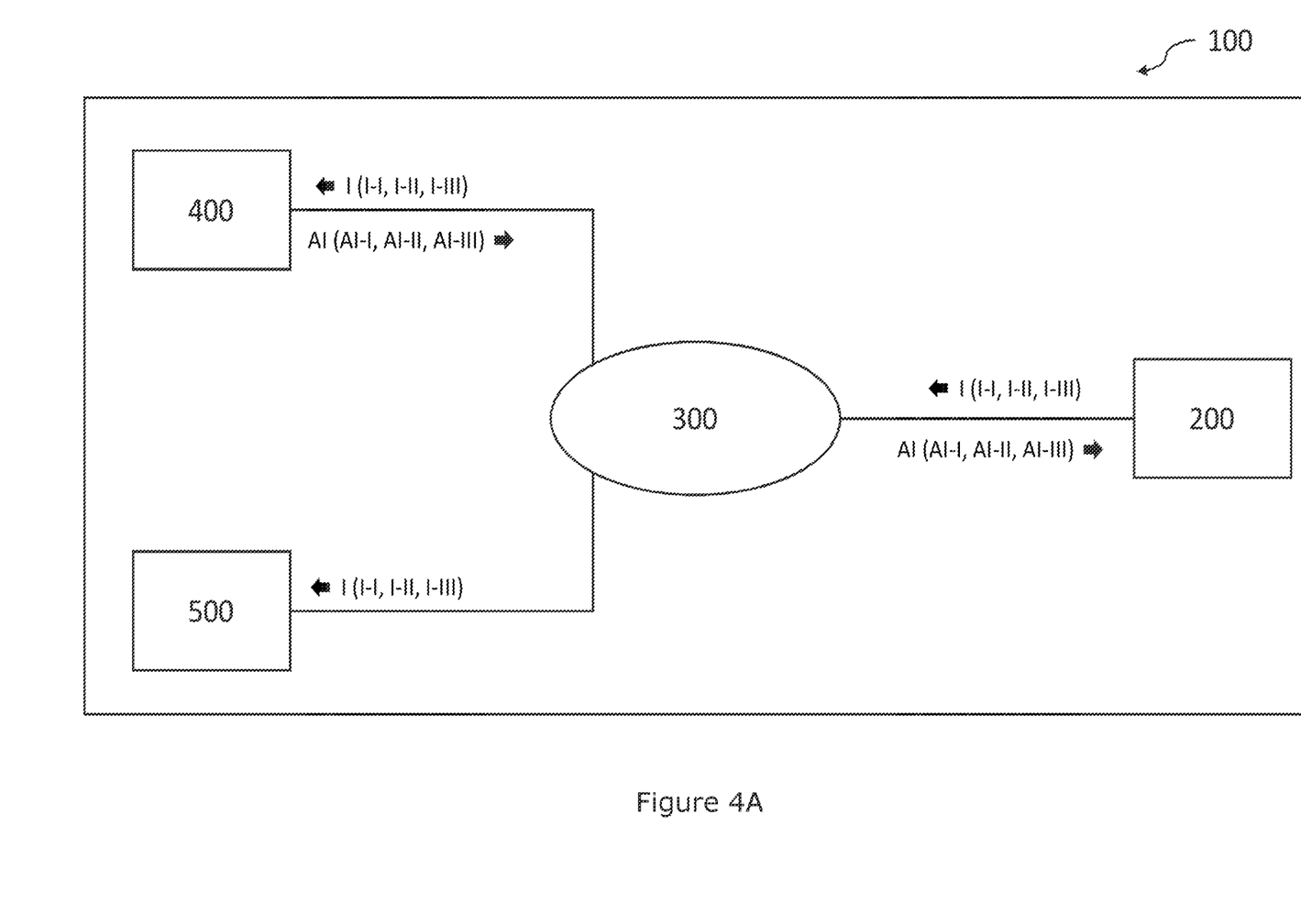
FIG. 4A shows an example of a schematic illustration of an RPC procedure according to the present disclosure.

FIG. 4A shows an example of a schematic illustration of an RPC procedure according to the present disclosure. The difference between the embodiment illustrated in FIG. 3A is that the first request I comprises a plurality of first sub-requests, according to this example three sub-requests I-I, I-II, I-III. The first consumer 200 sends the first request for data I to the data exchange system 300.

The data exchange system 300 receives the first request I from the first consumer 200 and transmits it to the first publisher 400 and the second publisher 500. As in the embodiment illustrated in FIG. 3A, either the first consumer 200 sends the first request for data I without any information about its origin or the data exchange system 300 removes this information before transmitting the first request I to the publishers 400, 500.

According to this embodiment, only the first publisher 400 is sending a reply AI to the first request I to the data exchange system 300. The first reply AI comprises a respective reply AI-I, AI-II, AI-II to all first sub-request I-I, I-II, and I-III. In other words, the first reply AI comprises a reply AI-I to the first sub-request I-I, a reply AI-II to the first sub-request I-II, as well as a reply AI-III to the first sub-request I-III. After receipt of the first reply AI, the data exchange system 300 transmits the first reply AI to the first consumer 200. As above, the first publisher 400 sends the reply AI without information about its origin, i.e. the first publisher 400, to the data exchange system 300 or the data exchange system 300 removes this information before transmitting the first reply AI to the first consumer 200.

Figure 4B:
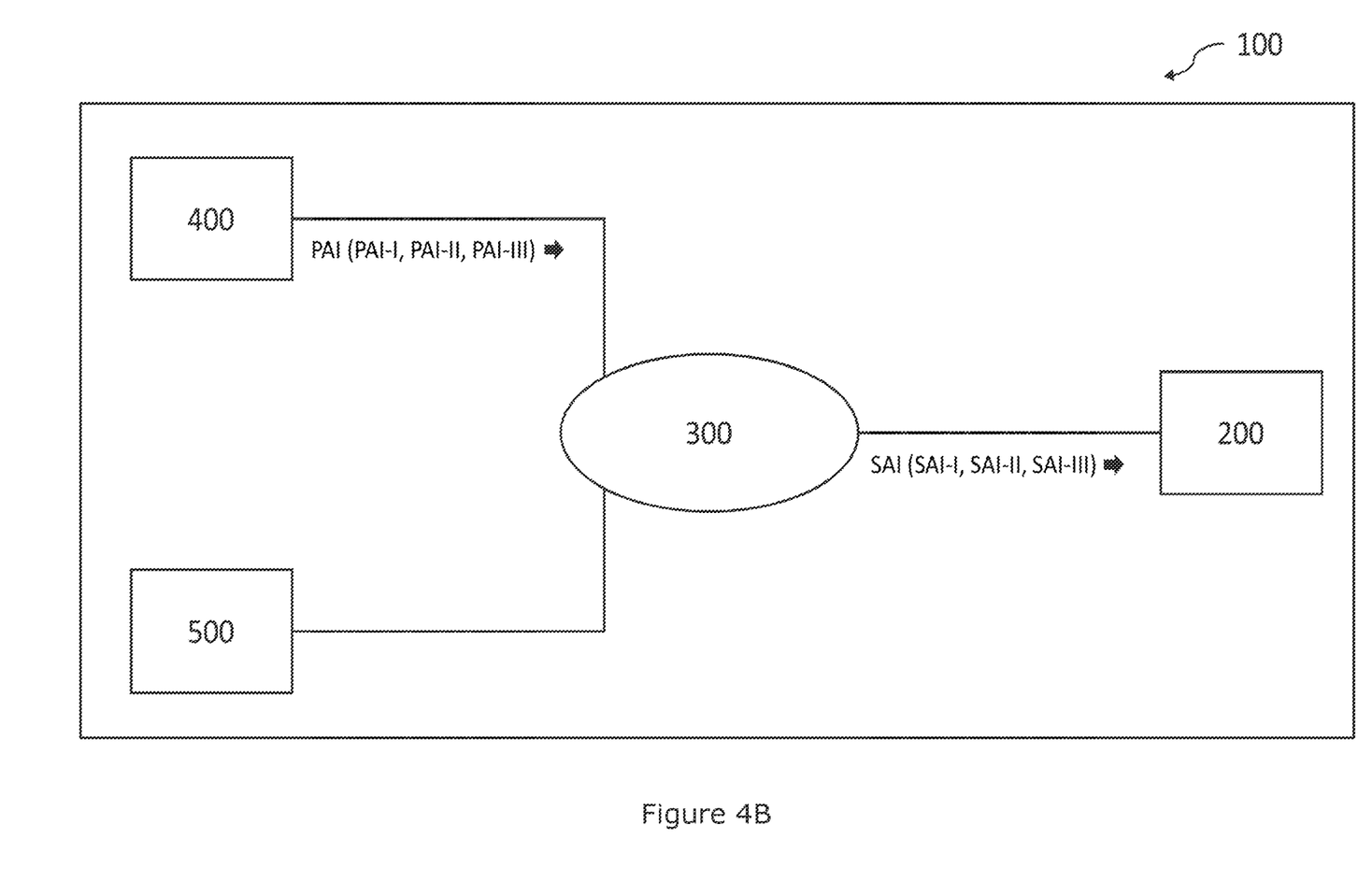
FIG. 4B shows an example of a schematic illustration of selective subscription according to the present disclosure following the RPC procedure shown in FIG. 4A.

FIG. 4B shows an example of a schematic illustration of selective subscription according to the present disclosure subsequent to the RPC procedure shown in FIG. 4A. After the first consumer 200 received the first reply AI from the data exchange system 300, the first publisher 400 publishes the data PAI requested in the first request I to the data exchange system 300. The data PAI comprises data sets PAI-I, PAI-II and PAI-III corresponding to the respective sub-requests I-I, I-II, and I-III. The data exchange system 300 notifies the first consumer 200 that the requested data are available and the first consumer 200 performs a first subscription SAI to the requested data PAI. The first subscription SAI comprises a plurality of sub-subscriptions SAI-I, SAI-II, and SAI-III corresponding to the data sets PAI-I, PAI-II and PAI-III.

Figure 5A:
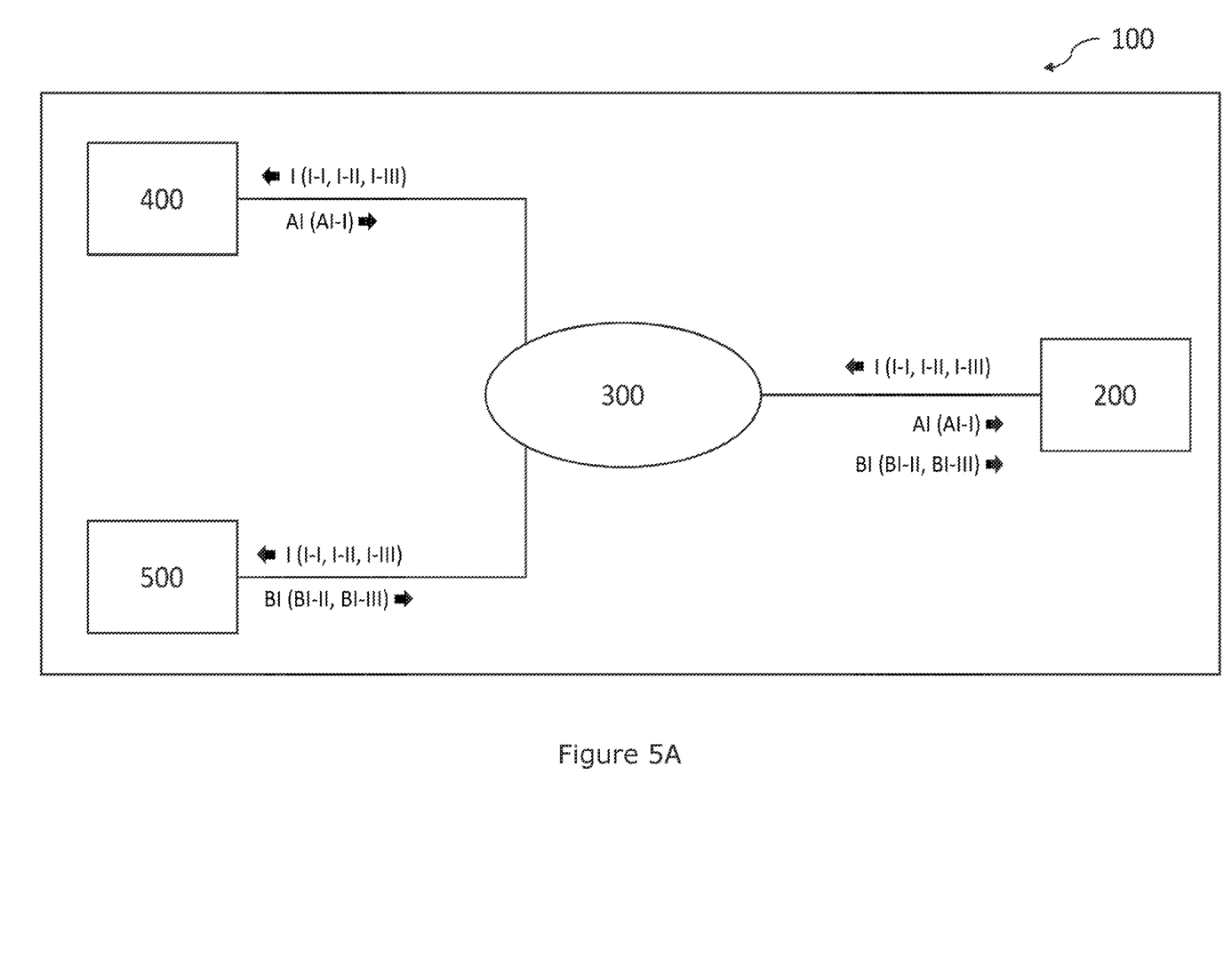
FIG. 5A shows an example of a schematic illustration of an RPC procedure according to the present disclosure.

FIG. 5A shows an example of a schematic illustration of an RPC procedure according to the present disclosure. The difference between the embodiment illustrated in FIG. 4A is that not only the first publisher 400 but also the second publisher 500 sends a reply to the first request I. The reply AI of the first publisher 400 comprises a reply AI-I to a respective first sub-request I-I and the reply BI of the second publisher 500 comprises replies BI-II and BI-III to respective other first sub-requests I-II and I-III. The data exchange system 300 sends the replies AI and BI to the first consumer 200. It is understood by the skilled person that the requests and replies according to this example must also not contain any pointers to their origin and are therefore treated as described above in the examples shown in FIGS. 3A and 4A. This also applies to the requests and replies to and from the second publisher 500.

Figure 5B:
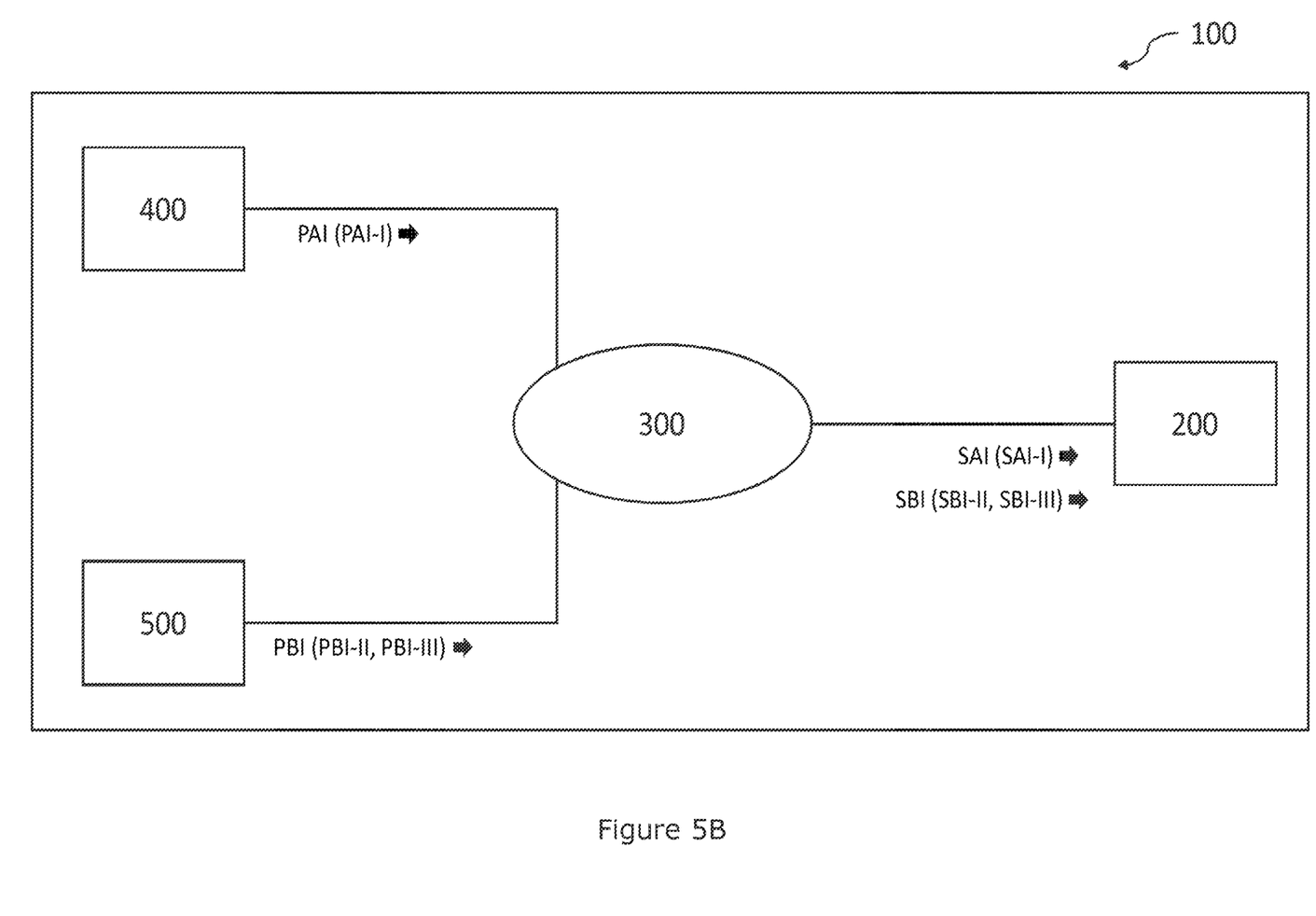
FIG. 5B shows an example of a schematic illustration of selective subscription according to the present disclosure following the RPC procedure shown in FIG. 5A.

FIG. 5B shows an example of a schematic illustration of selective subscription according to the present disclosure subsequent to the RPC procedure shown in FIG. 5A. After the first consumer 200 received the first replies AI and BI from the data exchange system 300, the first publisher 400 publishes the data PAI with the set of data PAI-I requested in the sub-request I-I of the first consumer 200 to the data exchange system 300. Likewise, the second publisher 500 publishes the data PBI with the set of data PBI-II and PBI-III requested in sub-requests I-II and I-III of the first consumer 200 to the data exchange system 300. The data exchange system 300 notifies the first consumer 200 that the requested data are available and the first consumer 200 performs a first subscription SAI with sub-subscription SAI-I to the requested data PAI and the respective data set PAI-I and a second subscription SBI with sub-subscriptions SBI-II and SBI-III to the requested data PBI and the respective set of data PBI-II and PBI-III.

Figure 6A:
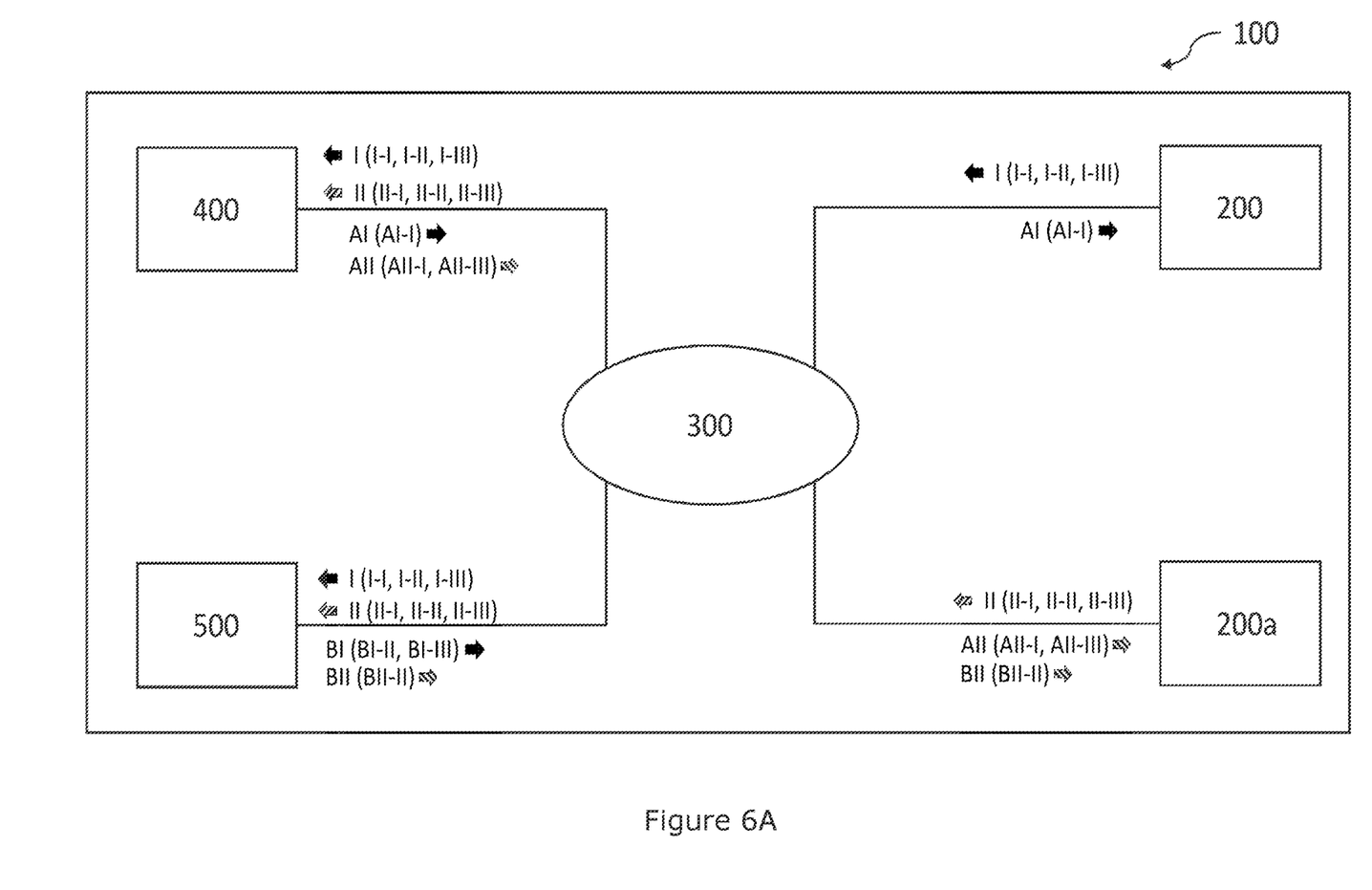
FIG. 6A shows an example of a schematic illustration of an RPC procedure according to the present disclosure.

FIG. 6A shows an example of a schematic illustration of an RPC procedure according to the present disclosure. The difference between the embodiment illustrated in FIG. 5A is that the service bus system 100 comprises a further consumer 200a. It is understood by the skilled person that the present disclosure is not limited to two consumers but generally a plurality of consumers is encompassed by the present disclosure.

The requests from the first consumer 200 and the replies to the requests from the first consumer 200 are the same as shown in the embodiment illustrated in FIG. 4A. The second consumer 200a transmits a second request for data II to the data exchange system 300. The second request II according to this example comprises a plurality of sub-requests II-I, II-II, II-III but is not limited to this but also one sub-request is possible. In addition, it is understood that the example of three sub-requests II-I, II-II, II-III is not limiting the present disclosure.

The data exchange system transmits the second request II to the plurality of publishers 400, 500. The second request II of the second consumer 200a is treated in the same manner as the first request I of the first consumer 200, i.e. either the second consumer 200s sends the second request for data II without any information about its origin, i.e. the second consumer 200a, or the data exchange system 300 removes this information (e.g. by removing any header or control information) before transmitting the second request II to the publishers 400, 500.

The reply AII of the first publisher 400 to the data exchange system 300 comprises a reply AII-I and AII-III to respective second sub-request II-I and II-III. The reply BII of the second publisher 500 to the data exchange system 300 comprises a reply BII-II to the respective sub-request II-II. The data exchange system 300 transmits the replies AII and BII to the first consumer 200. It is understood by the skilled person that the requests and replies according to this example must also not contain any pointers to their origin and are therefore treated as described above in the examples of the present disclosure. This also applies to the requests and replies to and from the second consumer 200a.

According to the present disclosure, at least a part of the first sub-requests I-I, I-II, and I-III of the first consumer 200 might be identical with at least a part of the second sub-requests II-I, II-II, and II-III of the second consumer 200a. For example, sub-request I-II of the first consumer 200 might be identical with sub-request II-III of the second consumer 200a

Figure 6B:
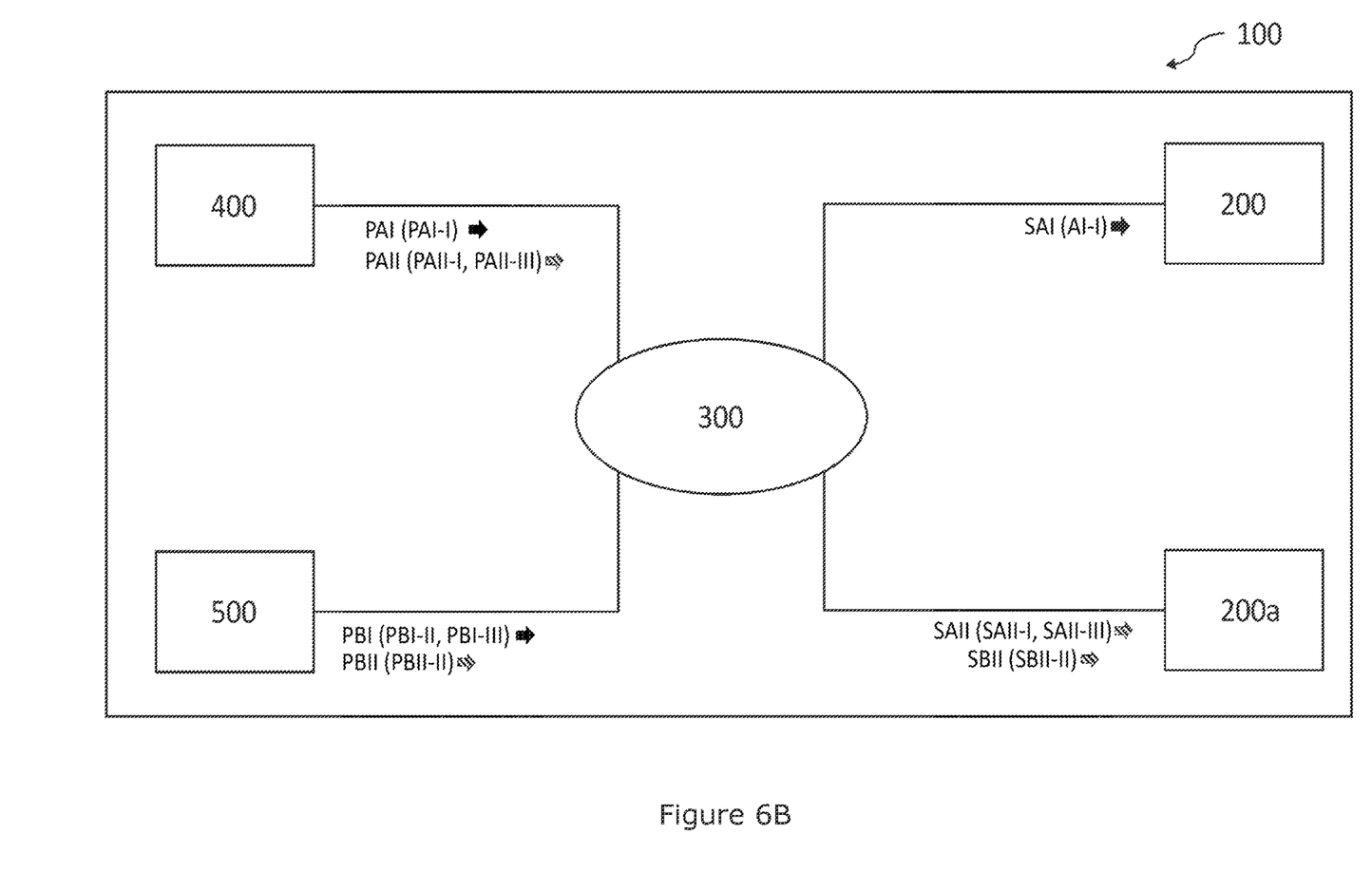
FIG. 6B shows an example of a schematic illustration of selective subscription according to the present disclosure following the RPC procedure shown in FIG. 6A.

FIG. 6B shows an example of a schematic illustration of selective subscription according to the present disclosure subsequent to the RPC procedure shown in FIG. 6A. After the first consumer 200 received the replies first replies AI and BI from the data exchange system 300 and the second consumer 200a received the replies first replies AII and BII from the data exchange system 300, the first publisher 400 publishes the data PAI with the set of data PAI-I requested in the sub-request I-I of the first consumer 200 to the data exchange system 300 and the first publisher 400 publishes the data PAII with the data sets PAII-I and PAII-III requested in the sub-request II-I and II-III of the second consumer 200a to the data exchange system 300. Likewise, the second publisher 500 publishes the data PBI with the set of data PBI-II and PBI-III requested in sub-requests I-II and I-III of the first consumer 200 to the data exchange system 300 and the second publisher 500 publishes the data PBII with the set of data PBII-II requested in sub-requests II-II of the second consumer 200a to the data exchange system 300. The data exchange system 300 notifies the first consumer 200 and the second consumer 200a that the requested data are available. The first consumer 200 performs a first subscription SAI with sub-subscription SAI-I to the requested data PAI and the respective data set PAI-I and a second subscription SBI with sub-subscriptions SBI-II and SBI-III to the requested data PBI and the respective set of data PBI-II and PBI-III. The second consumer 200a performs a first subscription SAII with sub-subscriptions SAII-I and SAII-II to the requested data PAII and the respective data sets PAII-I and PAII-III and a second subscription SBII with sub-subscription SBII-II to the requested data PBII and the respective set of data PBII-II.

While the disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope

What is claimed is:

1. A method for a remote procedure call (RPC) between entities in a service bus communication system, the service bus communication system comprising a first consumer, a data exchange system and a plurality of publishers, the method comprising:
   providing a dataspace within the data exchange system, wherein the dataspace is provided by a distributed communication middleware within the service bus communication system;
   receiving a first request for data from the first consumer at the data exchange system, the first request comprising a first sub-request for data;
   removing information about an origin of the first request for data;
   transmitting the first request, without any of the information about the origin from the first request for data, from the data exchange system to the plurality of publishers via the dataspace, wherein the first request is addressed to the dataspace and not directly to specific publishers;
   receiving, by the data exchange system, a first reply to the first request for data from a first publisher of the plurality of publishers, the first reply to the first request comprising a reply to the first sub-request;
   removing information about the origin of the first reply to the first request;
   transmitting the first reply to the first request from the data exchange system to the first consumer without any information about an origin of the first reply;
   after transmitting the first reply to the first consumer, receiving published data from the first publisher according to the first request via the dataspace;
   notifying, by the data exchange system, the first consumer that requested data according to the first request is available in the dataspace; and
   providing a connection for the first consumer to subscribe to the requested data in the dataspace, wherein the connection is configured to provide only what the first consumer requested.

2. The method according to claim 1, wherein:
   transmitting the first request comprises transmitting the first request for data without any information about the origin of the first request; and
   transmitting the first reply to the first request comprises transmitting the first reply without any information about the origin of the first reply.

3. The method according to claim 2, wherein:
   receiving the first reply to the first request comprises receiving the first reply from the first publisher without any information about the origin of the first reply.

4. The method according to claim 1, wherein:
   receiving the first request comprises receiving the first request for data from the first consumer without any information about the origin of the first request for data; and
   receiving the first reply to the first request comprises receiving the first reply from the first publisher without any information about the origin of the first reply.

5. The method according to claim 1, wherein the data exchange system comprises a data space provided by the distributed communication middleware.

6. The method according to claim 1, wherein the first request comprises a plurality of first sub-requests and wherein the first reply to the first request comprises replies to the respective first sub-requests.

7. The method according to claim 1, wherein the first request comprises a plurality of first sub-requests and wherein the first reply to the first request comprises a reply to a first set of the plurality of first sub-requests, the method further comprising:
   receiving, by the data exchange system, a second reply to the first request for data from a second publisher of the plurality of publishers, the second reply comprising a reply to a second set of the plurality of first sub-requests; and
   transmitting from the data exchange system the second reply to the first consumer.

8. The method according to claim 1, wherein the service bus communication system comprises a second consumer, the method further comprising:
   receiving a second request for data from the second consumer at the data exchange system, the second request comprising a second sub-request for data;
   transmitting the second request from the data exchange system to the plurality of publishers;

receiving, by the data exchange system, a first reply to the second request for data from the first publisher, the first reply to the second request comprising a reply to the second sub-request; and transmitting from the data exchange system the first reply to the second request to the second consumer.

9. The method according to claim 8, wherein the second request comprises a plurality of second sub-requests and wherein the first reply to the second request comprises replies to the respective second sub-requests.

10. The method according to claim 8, wherein the second request comprises a plurality of second sub-requests and wherein the first reply to the second request comprises a reply to a first set of the plurality of second sub-requests, the method further comprising:

receiving, by the data exchange system, a second reply to the second request for data from a second publisher of the plurality of publishers, the second reply to the second request for data comprising a reply to a second set of the plurality of second sub-requests; and transmitting from the data exchange system the second reply to the second consumer.

11. The method according to claim 1, wherein the information about the origin of the first reply identifies the first reply as emanating from the first publisher.

12. The method according to claim 1, wherein the first request is an RPC request.

13. The method according to claim 1, further comprising maintaining a decoupled relationship between the first consumer and the plurality of publishers, wherein the data exchange system does not notify the first consumer regarding which specific publisher of the plurality of publishers provided the first reply.

14. The method according to claim 1, wherein the first request further specifies a data distribution pattern selected from: transfer on data change, cyclic transfer, provision of current value, and coalescing of data, and wherein the first publisher publishes the data according to the specified data distribution pattern.

15. A service bus communication system comprising:
a first consumer;
a data exchange system; and
a plurality of publishers;
wherein the first consumer is configured to send a first request for data to the data exchange system, the first request comprising a first sub-request for data; and
wherein the data exchange system is configured to:
provide a dataspace within the data exchange system, wherein the dataspace is provided by a distributed communication middleware within the service bus communication system;
remove information about an origin of the first request for data;
transmit the first request, without any of the information about the origin from the first request for data, from the data exchange system to the plurality of publishers via the dataspace, wherein the first request is addressed to the dataspace and not directly to specific publishers;
receive a first reply to the first request for data from a first publisher of the plurality of publishers, the first reply to the first request comprising a reply to the first sub-request;
remove information about the origin of the first reply to the first request;
transmit the first reply to the first request to the first consumer without any information about an origin of the first reply;
after transmitting the first reply to the first consumer, receive published data from the first publisher according to the first request via the dataspace;
notify the first consumer that requested data according to the first request is available in the dataspace; and
provide a connection for the first consumer to subscribe to the requested data in the dataspace, wherein the connection is configured to provide only what the first consumer requested.

16. The service bus communication system according to claim 15, wherein the data exchange system is provided by a distributed communication middleware within the service bus communication system, the data exchange system comprising a data space provided by the distributed communication middleware.

17. The service bus communication system according to claim 15, wherein the first request comprises a plurality of first sub-requests and wherein the first reply comprises replies to the respective first sub-requests.

18. The service bus communication system according to claim 15, wherein the first request comprises a plurality of first sub-requests and wherein the first reply to the first request comprises a reply to a first set of the plurality of first sub-requests; and
wherein the data exchange system is configured to receive a second reply to the first request for data from a second publisher of the plurality of publishers and to transmit the second reply to the first request to the first consumer, the second reply to the first request comprising a reply to a second set of the plurality of first sub-requests.

19. The service bus communication system according to claim 15, wherein the service bus communication system comprises a second consumer;
wherein the second consumer is configured to send a second request for data to the data exchange system, the second request comprising a second sub-request for data;
wherein the data exchange system is configured to transmit the second request to the plurality of publishers, to receive a first reply to the second request for data from the first publisher, and transmit the first reply to the second request to the second consumer; and
wherein the first reply to the second request comprises a reply to the second sub-request.

20. The service bus communication system according to claim 19, wherein the second request comprises a plurality of second sub-requests and wherein the first reply to the second request comprises replies to the respective second sub-requests.

21. The service bus communication system according to claim 19, wherein the second request comprises a plurality of second sub-requests;
wherein the first reply to the second request comprises a reply to a first set of the plurality of second sub-requests;
wherein the data exchange system is configured to receive a second reply to the second request for data from a second publisher of the plurality of publishers and to transmit the second reply to the second request to the second consumer; and
wherein the second reply to the second request for data comprises a reply to a second set of the plurality of second sub-requests.

22. A system for a remote procedure call (RPC) between entities in a service bus communication system, the service bus communication system comprising a first consumer, a data exchange system and a plurality of publishers, the system comprising:
- at least one processor; and
- at least one memory with instructions thereon, wherein the instructions, when executed by the at least one processor, enable the system to perform:
  - providing a dataspace within the data exchange system, wherein the dataspace is provided by a distributed communication middleware within the service bus communication system,
  - receiving a first request for data from the first consumer at the data exchange system, the first request comprising a first sub-request for data,
  - removing information about an origin of the first request for data,
  - transmitting the first request, without any of the information about the origin from the first request for data, from the data exchange system to the plurality of publishers via the dataspace, wherein the first request is addressed to the dataspace and not directly to specific publishers,
  - receiving, by the data exchange system, a first reply to the first request for data from a first publisher of the plurality of publishers, the first reply to the first request comprising a reply to the first sub-request,
  - removing information about the origin of the first reply to the first request,
  - transmitting the first reply to the first request from the data exchange system to the first consumer, transmitting the first reply to the first request comprises transmitting the first reply without any information about an origin of the first reply,
  - after transmitting the first reply to the first consumer, receiving published data from the first publisher according to the first request via the dataspace;
  - notifying, by the data exchange system, the first consumer that requested data according to the first request is available in the dataspace, and
  - providing a connection for the first consumer to subscribe to the requested data in the dataspace, wherein the connection is configured to provide only what the first consumer requested.

* * * * *

UNITED STATES PATENT AND TRADEMARK OFFICE
CERTIFICATE OF CORRECTION

| | | |
|---|---|---|
| PATENT NO. | : 12,445,526 B2 | Page 1 of 1 |
| APPLICATION NO. | : 17/409445 | |
| DATED | : October 14, 2025 | |
| INVENTOR(S) | : Stephan Gerspach | |

It is certified that error appears in the above-identified patent and that said Letters Patent is hereby corrected as shown below:

In the Claims

In Column 10, Line 5, Claim 1:
Change "removing information about the origin of the first reply"
To --removing information about an origin of the first reply--

In Column 10, Line 9, Claim 1:
Change "information about an origin of the first reply;"
To --information about the origin of the first reply;--

In Column 11, Line 66, Claim 15:
Change "remove information about the origin of the first reply"
To --remove information about an origin of the first reply--

In Column 12, Line 2, Claim 15:
Change "without any information about an origin of"
To --without any information about the origin of--

In Column 14, Line 5, Claim 22:
Change "removing information about the origin of the first reply"
To --removing information about an origin of the first reply--

In Column 14, Line 11, Claim 22:
Change "about an origin of the first reply,"
To --about the origin of the first reply,--

Signed and Sealed this
Twenty-fifth Day of November, 2025

John A. Squires
*Director of the United States Patent and Trademark Office*